US011579804B2

(12) United States Patent
Deneui et al.

(10) Patent No.: US 11,579,804 B2
(45) Date of Patent: Feb. 14, 2023

(54) DEVICE INTERRUPT COALESCING WITH VARIOUS HOST BEHAVIORS

(71) Applicant: Western Digital Technologies, Inc., San Jose, CA (US)

(72) Inventors: Nathaniel Deneui, San Jose, CA (US); Daniel Edward Tuers, Kapaa, HI (US); Vijay Motagi, Fremont, CA (US); Akshay Naik, Milpitas, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/184,538

(22) Filed: Feb. 24, 2021

(65) Prior Publication Data

US 2022/0043602 A1 Feb. 10, 2022

Related U.S. Application Data

(60) Provisional application No. 63/062,252, filed on Aug. 6, 2020.

(51) Int. Cl.
*G06F 3/06* (2006.01)
*G06K 9/62* (2022.01)

(52) U.S. Cl.
CPC .......... *G06F 3/0659* (2013.01); *G06F 3/0611* (2013.01); *G06F 3/0653* (2013.01); *G06F 3/0679* (2013.01); *G06K 9/6256* (2013.01)

(58) Field of Classification Search
CPC .... G06F 3/0659; G06F 3/0611; G06F 3/0653; G06F 3/0679; G06K 9/6256
See application file for complete search history.

(56) References Cited

U.S. PATENT DOCUMENTS

| | | | | |
|---|---|---|---|---|
| 5,649,153 A | * | 7/1997 | McNutt | G06F 12/0866 711/112 |
| 8,478,924 B2 | * | 7/2013 | Ahmad | G06F 9/45558 710/262 |
| 10,127,234 B1 | * | 11/2018 | Krishnan | G06N 20/00 |
| 2009/0177829 A1 | * | 7/2009 | Worthington | G06F 9/4812 710/267 |
| 2010/0281216 A1 | * | 11/2010 | Patel | G06F 12/121 711/118 |
| 2018/0267724 A1 | * | 9/2018 | Jang | G11C 16/32 |
| 2019/0138220 A1 | * | 5/2019 | Hahn | G06F 3/0656 |

OTHER PUBLICATIONS

Wu, Yinjun, Edgar Dobriban, and Susan Davidson. "Deltagrad: Rapid retraining of machine learning models." International Conference on Machine Learning. PMLR, 2020. (Year: 2020).*

* cited by examiner

Primary Examiner — Kalpit Parikh
(74) Attorney, Agent, or Firm — Patterson + Sheridan, LLP; Steven H. VerSteeg

(57) ABSTRACT

The present disclosure generally relates to optimizing device interrupt coalescing based upon host device behavior. The data storage device maintains three functional states: a training state, a holding state, and a retraining state. The data storage device switches between states based upon host device behavior as well as the behavior of the data storage device. Once the data storage device finds the optimum conditions for coalescing, the data storage device will periodically test the conditions to adapt to changing host device behavior as well as data storage device behavior. In so doing, the data storage device can dynamically adjust interrupt coalescing to ensure optimum operation of the storage device.

20 Claims, 5 Drawing Sheets

DEVICE INTERRUPT COALESCING WITH VARIOUS HOST BEHAVIORS

CROSS-REFERENCE TO RELATED APPLICATIONS

This application claims benefit of U.S. provisional patent application Ser. No. 63/062,252, filed Aug. 6, 2020, which is herein incorporated by reference.

BACKGROUND OF THE DISCLOSURE

Field of the Disclosure

Embodiments of the present disclosure generally relate to optimizing device interrupt coalescing based upon host device behavior.

Description of the Related Art

NVM Express (NVMe) implements a paired submission queue and completion queue mechanism. In the paired mechanism, the host device places commands into the submission queue, and the data storage device places the resulting completions into the completion queue. When the completions are placed in the completion queue, the data storage device sends an interrupt signal to the host device to inform the host device that there is a completion in the completion queue.

Interrupt signals can be an issue. Particularly in terms of the number of interrupt signals as well as the frequency of interrupt signals. To lessen both the number and frequency of interrupt signals, interrupt coalescing may be used. Interrupt coalescing, in the broadest sense, involves not informing the host device of a completion in the completion queue until there are multiple completions, which thus decreases the number and frequency of interrupt signals.

In a constrained compute host device environment, coalescing presents an opportunity to improve overall system performance at the cost of average latency. However, over-coalescing can lower storage device performance as well. Finding the appropriate coalescing parameters can result in significant performance advantages over static settings or host derived settings.

Therefore, there is a need in the art for an algorithm takes steps to find the correct settings. Additionally, there is a need in the art for an algorithm that avoids over-coalescing, a condition that would result in lower overall performance.

SUMMARY OF THE DISCLOSURE

The present disclosure generally relates to optimizing device interrupt coalescing based upon host device behavior. The data storage device maintains three functional states: a training state, a holding state, and a retraining state. The data storage device switches between states based upon host device behavior as well as the behavior of the data storage device. Once the data storage device finds the optimum conditions for coalescing, the data storage device will periodically test the conditions to adapt to changing host device behavior as well as data storage device behavior. In so doing, the data storage device can dynamically adjust interrupt coalescing to ensure optimum operation of the storage device.

In one embodiment, data storage device comprises: at least one memory device; and a controller coupled to the at least one memory device, wherein the controller is configured to: dynamically adjust coalescing parameters for delivering interrupt signals to a host device, wherein the controller adjusts the coalescing parameters through a training state, a holding state, and a retraining state.

In another embodiment, a data storage device comprises: at least one memory device; and a controller coupled to the at least one memory device, wherein the controller is configured to: initiate a procedure call to initiate a check of a state of a host operation; read differential counts of ongoing host operations; and determine a state transition based upon an entrance state.

In another embodiment, a data storage device comprises: at least one memory device; means to determine a state of coalescing; and means for adjusting the state of coalescing.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to optimizing device interrupt coalescing based upon host device behavior. The data storage device maintains three functional states: a training state, a holding state, and a retraining state. The data storage device switches between states based upon host device behavior as well as the behavior of the data storage device. Once the data storage device finds the optimum conditions for coalescing, the data storage device will periodically test the conditions to adapt to changing host device behavior as well as data storage device behavior. In so doing, the data storage device can dynamically adjust interrupt coalescing to ensure optimum operation of the storage device.

Figure 1:
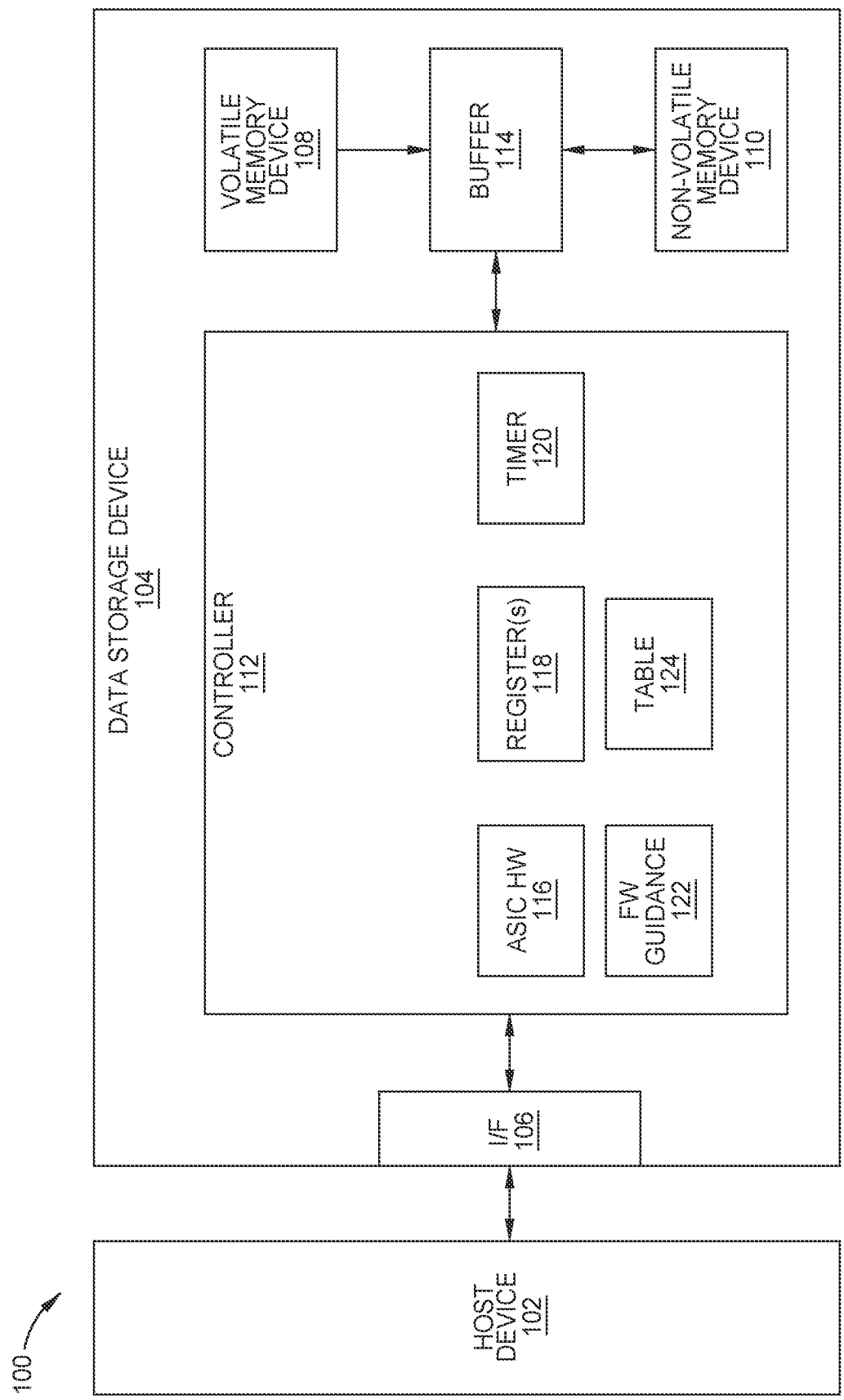
FIG. 1 is a schematic illustration of a storage system according to one embodiment.

FIG. 1 is a schematic illustration of a storage system 100 according to one embodiment. The storage device 100 includes a host device 102 coupled to a data storage device 104 through an interface 106. The data storage device 104 includes at least one volatile memory device 108 as well as at least one non-volatile memory device 110 that are each coupled to at least one memory buffer 114 and a controller 112. The controller 112 is coupled to the interface 106 to communicate with the host device 102.

The controller 112 includes ASIC hardware 116 that is capable of setting static interrupt coalescing parameters to be used in withholding the triggering of an interrupt until either a predetermined number of buffered messages have been accumulated or a predetermined period of time threshold has been reached.

The controller 112 also includes one or more hardware registers 118 that are capable of returning counts of various message types (e.g. NVM read, NVM write) in a timely fashion.

The controller 112 also includes one or more timers 120 that can accurately trigger a firmware procedure capable of implementing the algorithm disclosed herein. Instances between the timer trigger constitute a cycle of the algorithm.

The controller 112 also includes firmware guidance 122 that is capable of returning counts of the same message type (e.g. NVM read, NVM write). The controller 112 also includes a table 124 that contains interrupt signal coalescing parameters. More specifically, the table 124 includes predetermined optimal values of coalescing parameters specifically designed for various known workloads.

Figure 2:
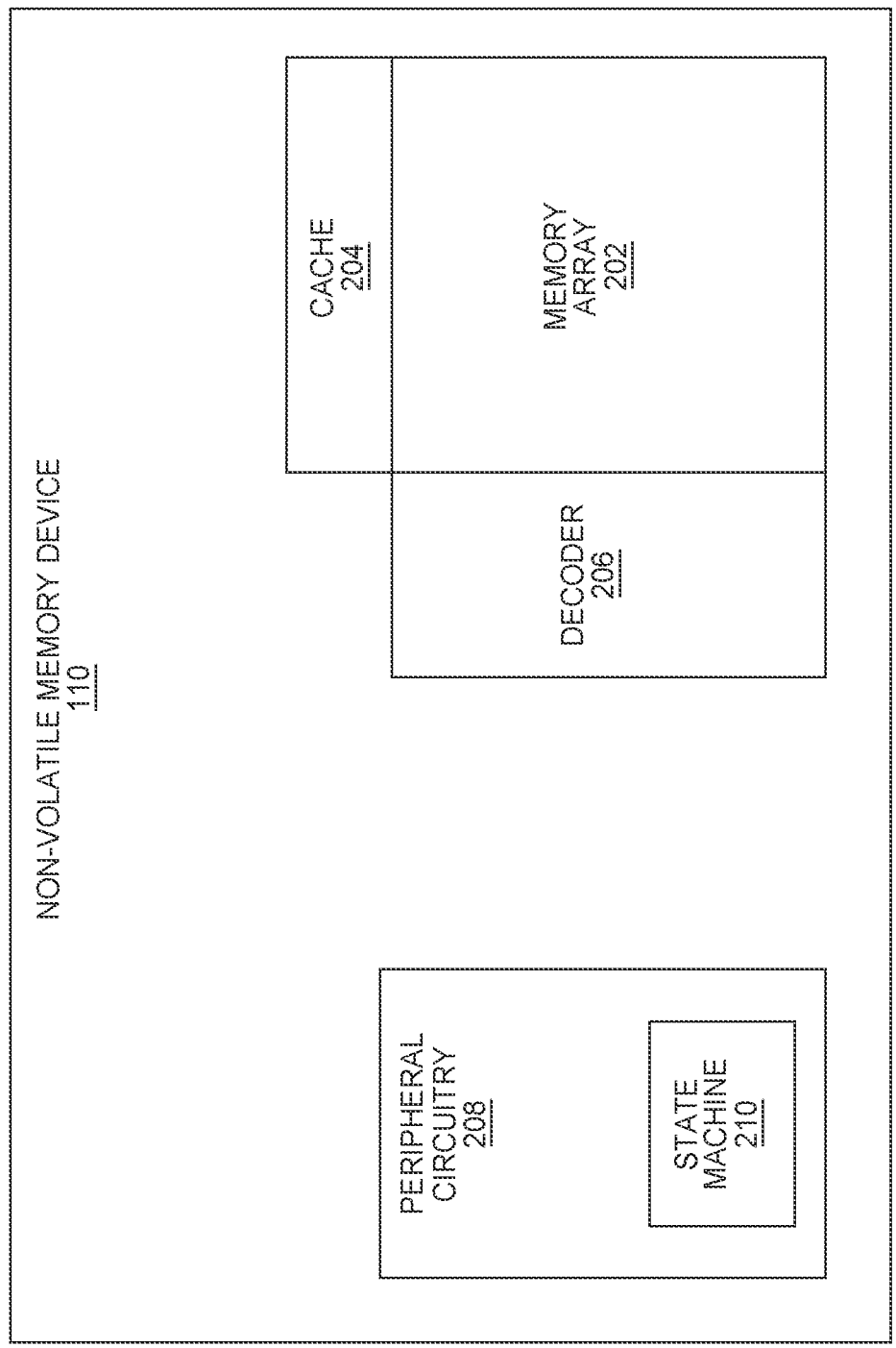
FIG. 2 is a schematic illustration of the non-volatile memory device of FIG. 1 according to one embodiment.

FIG. 2 is a schematic illustration of the non-volatile memory device 110 of FIG. 1 according to one embodiment. The non-volatile memory device 110 includes a memory array 202, a memory cache 204, a decoder 206, peripheral circuitry 208, and the state machine 210.

The memory array 202 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable; or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

The memory cache 204 caches data that is sensed from and/or that is to be programmed to the memory array 202. The decoder 206 decodes the data when read from the memory array 202. The peripheral circuitry 208 includes the state machine 210 that provides status information to the controller 112.

Figure 3:
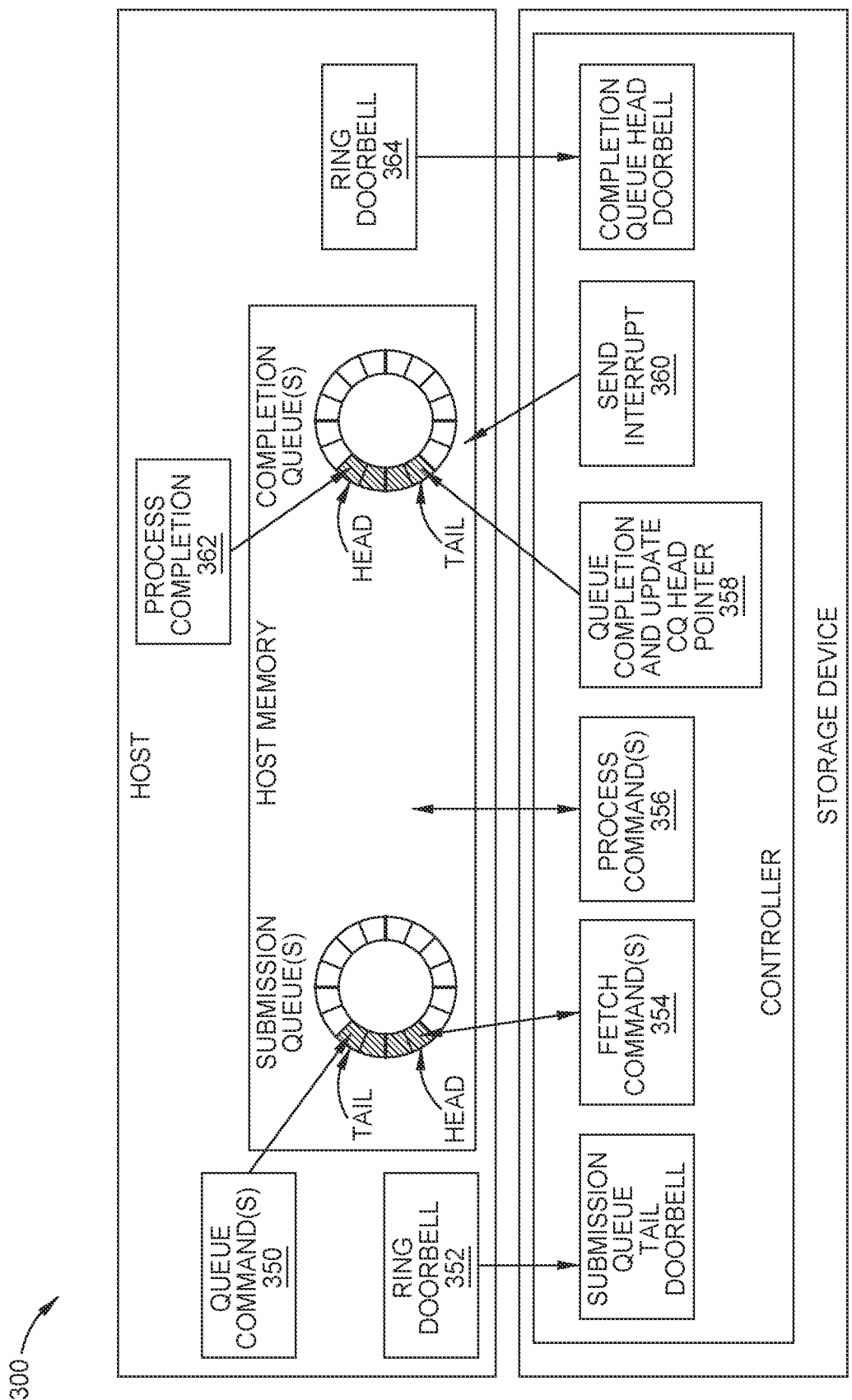
FIG. 3 is a block diagram illustrating communications between a host and a storage device, according to one embodiment.

FIG. 3 is a block diagram illustrating a method 300 of communications between a host and a storage device, according to one embodiment. Method 300 may be used with the storage system 100 having a host device 102 and a data storage device 104 comprising a controller 112.

Method 300 begins at operation 350, where the host device 102 writes a command into a submission queue as an entry. The host device 102 may write one or more commands into the submission queue at operation 350. The commands may be read commands or write commands. The host device 102 may comprise one or more submission queues.

In operation 352, the host device 102 writes one or more updated submission queue tail pointers and rings a doorbell or sends an interrupt signal to notify or signal the data storage device 104 of the new command that is ready to be executed. The host may write an updated submission queue tail pointer and send a doorbell or interrupt signal for each of the submission queues if there are more than one submission queues. In operation 354, in response to receiving the doorbell or interrupt signal, a controller 112 of the data storage device 104 fetches the command from the one or more submission queues.

In operation 356, the controller 112 of the data storage device 104 processes the command and writes or transfers data associated with the command to the host device memory. In operation 358, the controller 112 of the data storage device 104 writes a completion entry corresponding to the executed command to a completion queue of the host device and moves or updates the CQ head pointer to point to the newly written completion entry.

Operations 350-358 may be repeated one or more times to process a plurality of commands prior to operation 360. Several completion entries may be written to the completion queue in operation 358 without alerting the host device. To alert the host device of the completion entries in the completion queue, the completion queue (CQ) head pointer may be updated to point to the newest ending completion entry, or the last written entry, in the completion queue. Updating the CQ head pointer reveals the one or more completion entries in the completion queue to the host.

In operation 360, the controller 112 of the data storage device 104 generates and sends an interrupt signal or doorbell to the host device 102. The interrupt signal indicates that the command has been executed and data associated with the command is available in memory. The interrupt signal further notifies that the completion queue is ready to be read or processed. The data storage device 104 may delay sending the interrupt signal to the host device 102 based upon coalescing discussed herein.

In operation 362, the host device 102 processes the completion entry. In operation 364, the host device 102 writes an updated CQ head pointer to the data storage device 104 and rings the doorbell or sends an interrupt signal to the data storage device 104 to release the completion entry.

As noted above, interrupt coalescing is used to reduce the number of interrupt signals (i.e., operation 360). Coalescing is used in an environment where the data storage device passes messages to a host device that may or may not be constrained by limited compute resources. The coalescing optimizes the amount of pending messages contained in a number of serviceable queues prior to the interrupt signal being send to the host. The optimization is performed as a sequenced staged algorithm between device facilitated hardware and software provided a limited information availability from firmware.

Figure 4:
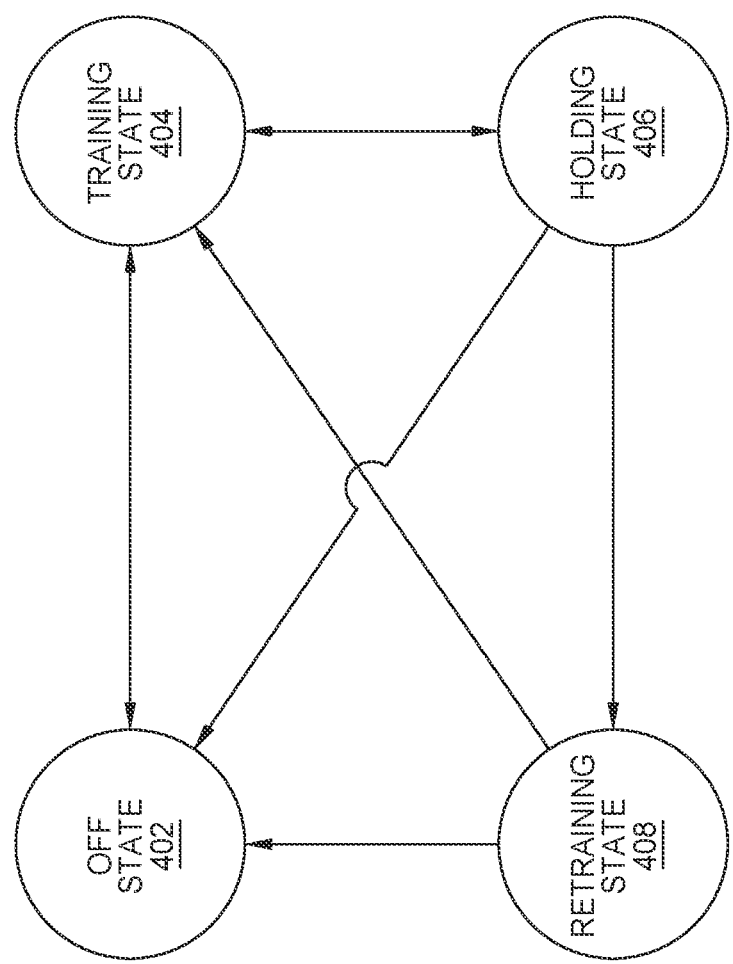
FIG. 4 is a state diagram according to one embodiment.

The algorithm maintains three functional states: a training state, a holding state, and a retraining state. FIG. 4 is a state diagram according to one embodiment. The state diagram has an off state 402 which is the state where there is no coalescing. The off state 402 can occur in a storage system where the host device does not accept coalescing. In the off state 402, the maximum step within the table is set to 0 and the previous maximum input/out operations (IOPS) is set to 0. If IOPS is greater than a predetermined value (e.g., 80 k) for predetermined number of cycles (e.g. 2 cycles), then the algorithm may transition from the off state 402 to the training state 404.

The training state 404 attempts to observe relative performance as the algorithm measures relative performance. Under conditions of success, the training state 404 will transition up on the table of predetermined coalescing parameters. If the absolute performance exceeds a prior remembered maximum, then a new optimal table position is set. In the training state 404, the training comprises determining of the IOPS is greater than the previous maximum IOPS. If the IOPS is greater than the previous maximum IOPS then the previous maximum IOPS is reset to the value of the currently determined IOPS and the coalesce step in the table is increased by 1. If the determined IOPS is greater than a predetermined percentage (e.g., 94%) of the previous maximum IOPS, then the algorithm remains in the training state 404. If, however, the determined IOPS is less than the predetermined percentage, then the algorithm moves to the holding state 406. If training fails or the storage device does not accept coalescing, then the algorithm moves to the off state 402.

The holding state 406 will nominally keep the last remembered optimal state found in the training state 404 and maintain the last remembered optimal state. The holding state 406 will check for anomalous relative performance and, in the case of unexpected increase or decrease in relative performance from the prior remembered maximum absolute performance, the subsequent state will transition to the retrain state 408. On a fixed basis, stable holding states 406 will reenter a training state 404 in order to test for changes in fixed host device patterns. Additionally, after a predetermined number of static fails (e.g., 15 cycles of static fails), the algorithm may transition to the training state 404. When in the holding state 406, the coalesce step will equal the maximum step. Also, the algorithm will remain in the holding state 406 if IOPS is greater than a low predetermined percentage (e.g., 75 percent) of the previous maximum or if the IOPS is less than a high predetermined percentage (e.g., 112 percent) of the previous maximum. If IOPS is greater than high predetermined percentage or less than the low predetermined percentage, then the algorithm will transition to the retraining state 408. If the storage device does not accept coalescing, then the algorithm moves to the off state 402.

The retraining state 408 is a sequence that resets the state machine to the initial state and disables the interrupt coalescing for one cycle of the timer. A prior remembered optimal state is forgotten and the next state will always be the initial training state 404. Additionally, the retraining state 408 will always result in setting to the initial position on the precalculated coalescing parameters. More specifically, the coalesce step is set to 0 and the coalescing is turned off for one cycle. The previous maximum is set to 0 and the maximum step is set to 0. If the storage device does not accept coalescing, then the algorithm moves to the off state 402. The table below provides an example of the Table of predetermined coalescing parameters.

| Step | Read Threshold | Read Time | Write Threshold | Write Time | Mixed Threshold | Mixed Time |
|---|---|---|---|---|---|---|
| 0 | 1 | 0 | 1 | 0 | 1 | 0 |
| 1 | 20 | 30 | 2 | 25 | 10 | 25 |
| 2 | 20 | 60 | 4 | 50 | 10 | 50 |
| 3 | 20 | 90 | 6 | 75 | 10 | 75 |
| 4 | 20 | 120 | 8 | 100 | 10 | 100 |
| 5 | 20 | 150 | 10 | 125 | 10 | 125 |
| 6 | 20 | 180 | 12 | 150 | 10 | 150 |
| 7 | 20 | 210 | 14 | 175 | 10 | 175 |
| 8 | 20 | 240 | 16 | 200 | 10 | 200 |
| 9 | 20 | 270 | 18 | 225 | 10 | 225 |
| 10 | 20 | 300 | 20 | 250 | 10 | 250 |
| 11 | 20 | 330 | 20 | 275 | 10 | 275 |
| 12 | 20 | 360 | 20 | 300 | 10 | 300 |
| 13 | | | 20 | 325 | 10 | 325 |
| 14 | | | 20 | 350 | 10 | 350 |
| 15 | | | 20 | 375 | 10 | 375 |

Figure 5:
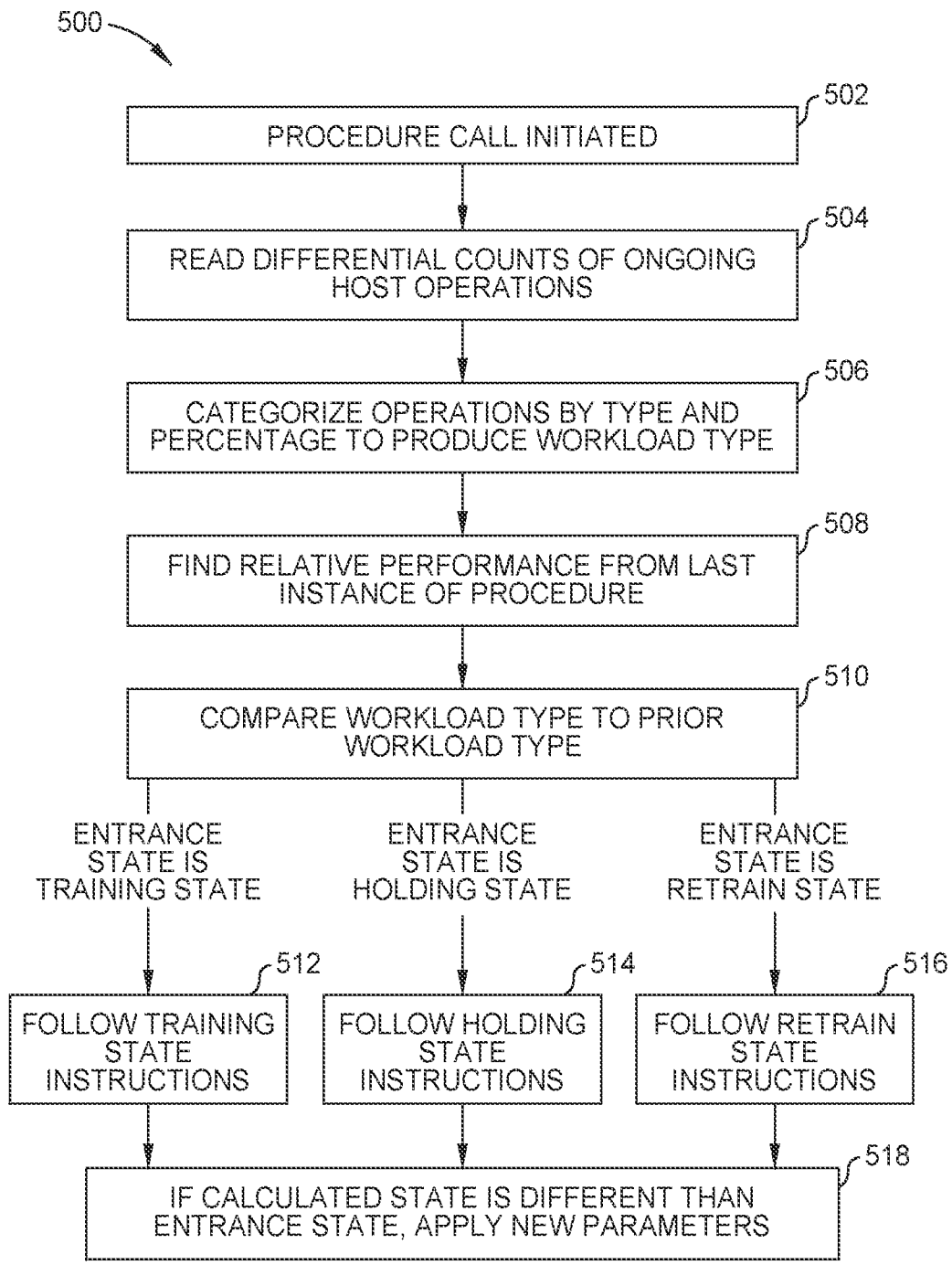
FIG. 5 is a flowchart illustrating a method of device interrupt coalescing according to one embodiment.

FIG. 5 is a flowchart illustrating a method 500 of device interrupt coalescing according to one embodiment. Initially, the data storage device utilizes a timer to initiate a procedure call to initiate a check of the state of the host device operation in block 502. The data storage device then reads the differential counts of the ongoing host device operations in block 504 and performs several checks. For the first check in block 506, the data storage device categorizes the operations of the host device by type and percentage to produce a workload type. Then, in block 508, the data storage device finds the relative performance from the last instance of the procedure. Then, in block 510, the data storage device compares the workload type to the prior workload type. It is to be understood that the order of blocks 506, 508, and 510 may be in any order, and the order presented is merely for exemplification purposes. The data storage device will then determine the state transition based upon the entrance state and make a decision based upon the information.

If the entrance state is the training state, then the training state instructions will be followed in block 512. More specifically, when the training state is the entrance state, then the algorithm will transition to the retraining state if the workload type is different. If the relative performance is greater or smaller, the algorithm will increase the bet size by incrementing the state according to the table of predetermined coalescing parameters such as shown in the table above. If the absolute performance exceeds a prior remembered maximum, then a new optimal table position is calculated. If the relative performance is degraded beyond a predetermined threshold, the algorithm transitions to the holding state which will set the prior remembered optimal state found in training.

If the entrance state is the holding state, then the holding state instructions will be followed in block 514. More specifically, when the holding state is the entrance state, the algorithm will transition to the retraining state if the workload type is different. The algorithm will transition to the retraining state if there is an unexpected performance shift from the prior remembered maximum. If there is a large number of procedure calls in the holding state (e.g., the number of holding calls exceeds a predetermined threshold), then the algorithm transitions to the training state.

If the entrance state is the retraining state, then the retraining state instructions will be followed in block 516. More specifically, when the retraining state is the entrance state, the algorithm resets to the initial training state and waits a cycle to perform any training.

Once the algorithm has made a decision based upon the entrance state, then if the calculated state on the table of pre-determined coalescing parameters is different than the entrance state, then the algorithm applies the new parameters to the ASIC hardware in block 518. The procedure exit remembers the last relative performance measurement.

The goal of the table of predetermined coalescing parameters and the sequenced state transition is to handle specific optimization for a large number of workloads; granular detection of optimal coalescing parameters to be used in the hardware, and due to the relatively significant number of state, the cost to relative performance for a non-optimal coalescing parameters applied to the hardware is limited.

Previous coalescing utilized static settings or setting provided by the host device. With static settings or gated settings, results may be improved in some host workloads and some host compute resources, but may be susceptible to over-coalescing. By contrast, the dynamic coalescing discussed herein is far more advantageous. Specifically, the algorithmic state machine based approach discussed herein does the following: prevents falling into non-optimal over-coalesced states that result in lower overall performance; with smaller increments, lowers the impact of exceeding ideal coalescing parameters, resulting in only 1 cycle of smaller performance impact; running coalescing based on detected host device workload allows for different coalescing parameters based on data storage device performance under those workloads, which results in tuned settings that can be utilized for highly marginal cases and result in overall performance improvements; finds more optimal settings based on sequential search through pre-defined coalesced parameters; operates computationally quickly, allowing quick traversal through the algorithm and maintaining data storage device performance; and in environments where the host device is not constrained, the algorithm can quickly find coalescing parameters that do not result in data storage device performance drops but instead result in additional compute resources being freed through some message interrupt coalescing.

Thus, by dynamically adjusting coalescing parameters using the algorithm discussed herein, data storage device performance is managed efficiently resulting in an increase in overall device performance.

In one embodiment, data storage device comprises: at least one memory device; and a controller coupled to the at least one memory device, wherein the controller is configured to: dynamically adjust coalescing parameters for delivering interrupt signals to a host device, wherein the controller adjusts the coalescing parameters through a training state, a holding state, and a retraining state. The training state comprises observing performance of coalescing, wherein under conditions of success increased coalescing parameters are utilized. If the observed performance of coalescing exceeds a prior maximum coalescing parameter, then a new coalescing parameter position is set. The holding state nominally keeps a last remembered optimal state determined in the training state, wherein the holding state checks for anomalous performance, wherein when an unexpected change in performance occurs transitions to the retraining state. The holding state transitions to the training state to test for changes in fixed host device patterns. The retraining state resets a state machine to an initial state, wherein the retrain state disables interrupt signal coalescing. The controller comprises a timer and wherein the retraining state disables the interrupt signal coalescing for one cycle of the timer.

In another embodiment, a data storage device comprises: at least one memory device; and a controller coupled to the at least one memory device, wherein the controller is configured to: initiate a procedure call to initiate a check of a state of a host operation; read differential counts of ongoing host operations; and determine a state transition based upon an entrance state. The controller is further configured to: categorize data storage device operations by type and percentage to produce a workload type; find relative performance from a last instance of a procedure call; and compare the workload type to a prior workload type. When the entrance state is a training state and the workload type is different, the controller is configured to transition to a retrain state. When the entrance state is a training state and the relative performance has changed from the last instance, the controller is configured to increase a state according to a table of predetermined coalescing parameters. When the entrance state is a training state and the relative performance has decreased beyond a predetermined threshold, the controller is configured to transition to a hold state. When the entrance state is a holding state and the workload type is different, the controller is configured to transition to a retrain state. When the entrance state is a holding state and an unexpected performance shifts from a prior remembered maximum, the controller is configured to transition to a retrain state. When the entrance state is a holding state and after a predetermined number of procedural calls, the controller is configured to transition to a training state. When the entrance state is a retrain state, the controller is configured to transition to a training state and wait a cycle.

In another embodiment, a data storage device comprises: at least one memory device; means to determine a state of coalescing; and means for adjusting the state of coalescing. The data storage device further comprises a state machine having a training state, a retraining state, and a holding state. The means for adjusting the state of coalescing is configured to switch between the training state, the retraining state, and the holding state to optimize coalescing. The data storage device further comprises a table of predetermined optimal values of increasing coalescing parameters corresponding to known data storage device workloads.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   at least one memory device; and
   a controller coupled to the at least one memory device, wherein the controller is configured to:
   dynamically adjust coalescing parameters for delivering interrupt signals to a host device based on workload types to optimize the number of interrupt signals delivered, wherein the controller adjusts the coalescing parameters through a training state, a holding state, and a retraining state,
   wherein, in the retraining state, a last remembered maximum optimal state for coalescing parameters is forgotten and the interrupt coalescing is temporarily disabled until the training state is re-entered to determine a new maximum optimal state for coalescing parameters.

2. The data storage device of claim 1, wherein the training state comprises observing performance of coalescing, wherein under conditions of success increased coalescing parameters are utilized.

3. The data storage device of claim 2, wherein if the observed performance of coalescing exceeds a prior maximum coalescing parameter, then a new coalescing parameter position is set.

4. The data storage device of claim 1, wherein the holding state nominally keeps a last remembered optimal state determined in the training state, wherein the holding state checks for anomalous performance, wherein when an unexpected change in performance occurs transitions to the retraining state.

5. The data storage device of claim 1, wherein the holding state transitions to the training state to test for changes in fixed host device patterns.

6. The data storage device of claim 1, wherein the retrain state resets a state machine to an initial state prior to re-entering the training state.

7. The data storage device of claim 6, wherein the controller comprises a timer and wherein the retraining state disables the interrupt signal coalescing for one cycle of the timer.

8. A data storage device, comprising:
at least one memory device; and
a controller coupled to the at least one memory device, wherein the controller is configured to:
  initiate a procedure call to initiate a check of a state of a host operation;
  read differential counts of ongoing host operations;
  determine a state transition based upon an entrance state; and
  dynamically adjust coalescing parameters for delivering interrupt signals to a host device based on workload types to optimize the number of interrupt signals delivered, wherein:
    the controller adjusts the coalescing parameters through a training state, a holding state, and a retraining state, and
    in the retraining state, a last remembered maximum optimal state for coalescing parameters is forgotten and the interrupt coalescing is temporarily disabled until the training state is re-entered to determine a new maximum optimal state for coalescing parameters.

9. The data storage device of claim 8, wherein, prior to dynamically adjusting the coalescing parameters, the controller is further configured to:
  categorize data storage device operations by type and percentage to produce a workload type;
  find relative performance from a last instance of a procedure call; and
  compare the workload type to a prior workload type.

10. The data storage device of claim 9, wherein when the entrance state is the training state and the workload type is different, the controller is configured to transition to the retrain state.

11. The data storage device of claim 9, wherein when the entrance state is the training state and the relative performance has changed from the last instance, the controller is configured to increase a state according to a table of predetermined coalescing parameters.

12. The data storage device of claim 9, wherein when the entrance state is the training state and the relative performance has decreased beyond a predetermined threshold, the controller is configured to transition to the holding state.

13. The data storage device of claim 9, wherein when the entrance state is the holding state and the workload type is different, the controller is configured to transition to the retraining state.

14. The data storage device of claim 9, wherein when the entrance state is the holding state and an unexpected performance shifts from a prior remembered maximum, the controller is configured to transition to the retraining state.

15. The data storage device of claim 9, wherein when the entrance state is the holding state and after a predetermined number of procedural calls, the controller is configured to transition to the training state.

16. The data storage device of claim 9, wherein when the entrance state is the retraining state, the controller is configured to transition to the training state and wait a cycle.

17. A data storage device, comprising:
at least one memory device;
means to determine a state of coalescing;
means for adjusting the state of coalescing;
means for dynamically adjusting coalescing parameters for delivering interrupt signals to a host device based on workload types to optimize the number of interrupt signals delivered; and
a state machine having a training state, a retraining state, and a holding state, wherein, in the retraining state, a last remembered maximum optimal state for coalescing parameters is forgotten and the interrupt coalescing is temporarily disabled until the training state is re-entered to determine a new maximum optimal state for coalescing parameters.

18. The data storage device of claim 17, wherein the means for adjusting the state of coalescing is configured to switch between the training state, the retraining state, and the holding state to optimize coalescing.

19. The data storage device of claim 17, further comprising a table of predetermined optimal values of increasing coalescing parameters corresponding to known data storage device workloads.

20. The data storage device of claim 17, further comprising a timer and wherein the retraining state disables the interrupt signal coalescing for one cycle of the timer.

* * * * *